US008526525B2

(12) United States Patent
Keerthi

(10) Patent No.: US 8,526,525 B2
(45) Date of Patent: Sep. 3, 2013

(54) INTERFERENCE AVOIDING MIMO

(76) Inventor: Arvind V. Keerthi, Bangalore (IN)

( * ) Notice: Subject to any disclaimer, the term of this patent is extended or adjusted under 35 U.S.C. 154(b) by 1352 days.

(21) Appl. No.: 12/255,572

(22) Filed: Oct. 21, 2008

(65) Prior Publication Data

US 2010/0054356 A1    Mar. 4, 2010

(30) Foreign Application Priority Data

Sep. 1, 2008    (IN) .............................. 2130/CHE/2008

(51) Int. Cl.
*H04B 7/02*    (2006.01)
(52) U.S. Cl.
USPC ........... 375/267; 375/259; 375/260; 375/271; 375/295; 375/316
(58) Field of Classification Search
USPC ................. 375/219, 259, 260, 262, 265, 267, 375/270, 271, 295, 299, 301, 316, 322, 340, 375/342, 345, 350
See application file for complete search history.

(56) References Cited

U.S. PATENT DOCUMENTS

| | | | | |
|---|---|---|---|---|
| 8,036,313 | B2 * | 10/2011 | Zhou et al. ...................... | 375/316 |
| 8,223,737 | B2 * | 7/2012 | Nangia et al. .................. | 370/344 |
| 8,243,848 | B2 * | 8/2012 | Ohwatari et al. ............. | 375/295 |
| 2004/0157646 | A1 * | 8/2004 | Raleigh et al. ............. | 455/562.1 |
| 2005/0249304 | A1 * | 11/2005 | Takano et al. .................. | 375/267 |
| 2006/0072682 | A1 * | 4/2006 | Kent et al. ...................... | 375/267 |
| 2007/0002963 | A1 * | 1/2007 | Pedersen et al. .............. | 375/267 |
| 2007/0218949 | A1 * | 9/2007 | Cleveland ...................... | 455/561 |
| 2008/0187067 | A1 * | 8/2008 | Wang et al. .................... | 375/267 |
| 2009/0092198 | A1 * | 4/2009 | Motoyoshi et al. ........... | 375/267 |
| 2010/0178884 | A1 * | 7/2010 | Nassiri-Toussi et al. ...... | 455/101 |
| 2013/0016763 | A1 * | 1/2013 | Kotecha et al. ............... | 375/219 |

FOREIGN PATENT DOCUMENTS

WO    WO 2007015292 A1 *    2/2007

OTHER PUBLICATIONS

Forenza et al., "Benefit of Pattern Diversity via Two-Element Array of Circular Patch Antennas in Indoor Clustered MIMO Channels", IEEE Transactions on Communications, May 2006, vol. 54, No. 5, pp. 943-954.
Sanayei et al., "Antenna Selection in MIMO Systems", IEEE Communications Magazine, IEEE, Oct. 2004, vol. 42, Issue 10, pp. 68-73.
Molisch et al., "MIMO Systems with Antenna Selection—An Overview", Mitsubishi Electric Research Labs, Mar. 18, 2004, pp. 1-6.
"MIMO SMART Antennas are Key to 4G Mobile Broadband Adoption", Oct. 24, 2007, pp. 1-2, obtained from url: <http://www.3g.co.uk/PR/Oct2007/5336.htm>.
Shaver, "Broadband and 4G Communications—Architectures", Texas Instruments DSPS R&D Center, Communications Systems Laboratory, May 2004, Texas Instruments Technology, Dallas Texas, pp. 1-15.

* cited by examiner

*Primary Examiner* — Hirdepal Singh
(74) *Attorney, Agent, or Firm* — Maschoff Brennan

(57) ABSTRACT

Method and apparatus for communicating a radio signal between a first station and a second station, including estimating at least one characteristic of a radio channel from the first station including a first plurality of weightable transceiving elements, to the second station including a second plurality of weightable transceiving elements; calculating a receive weighting of at least one weightable transceiving element at the second station, responsive to the estimate; calculating a transmit weighting of at least one weightable transceiving element at the first station; and then communicating the radio signal by transmitting from the transmit-weighted transceiving elements at the first station, over the radio channel, to the receive-weighted transceiving elements at the second station, while reducing the response to unwanted interfering signals.

46 Claims, 9 Drawing Sheets

FIG. 4

```
set I_A = R_A  (with R_A obtained from Thread-II)
do

Perform an Eigenvalue Decomposition of I_A:  [Q_A, Λ_A] = eig(I_A)
    Determine r_A as:  r_A = Q_A Λ_A^{1/2} lrsv(C_A^t Q_A Λ_A^{1/2})
    Define an intermediate variable α as:  α ≡ C_A (C_A r_A)/||C_A r_A||
    Update I_A using:  I_A ← I_A − αα^t until r_A converges
```

FIG. 5

Set $R_A$ to identity
When a new $x_A$ becomes available, update $R_A$ using
$$R_A \leftarrow \alpha R_A + (1-\alpha) x_A x_A^\dagger.$$

INTERFERENCE AVOIDING MIMO

CROSS-REFERENCE TO RELATED APPLICATION

The present application claims the benefit of Indian Patent Application Serial No. 2130/CHE/2008, filed Sep. 1, 2008, the contents of which are hereby incorporated by reference in its entirety.

BACKGROUND

MIMO (Multiple Input Multiple Output) is a technology that can achieve wireless communication by employing multiple antennas at both receive and transmit stations. Typically, a radio wave transmitted from each antenna element is adjusted in amplitude and phase so as to maximize the transmit-array's radiated power in the direction of the receive array.

SUMMARY

The present application relates, in general, to methods of communicating by radio between at least two terminals, each having multiple transmitting elements and multiple receiving elements. In accordance with one aspect of the present application, embodiments can achieve higher speed wireless communication in the presence of an interfering signal by employing multiple antenna elements at both receive and transmit stations, weighted to reduce sensitivity to the interfering signal.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 shows a flow chart of the receiver optimization.

FIG. 5 shows a flow chart of steps to estimate the interference covariance matrix.

DETAILED DESCRIPTION

Figure 1:
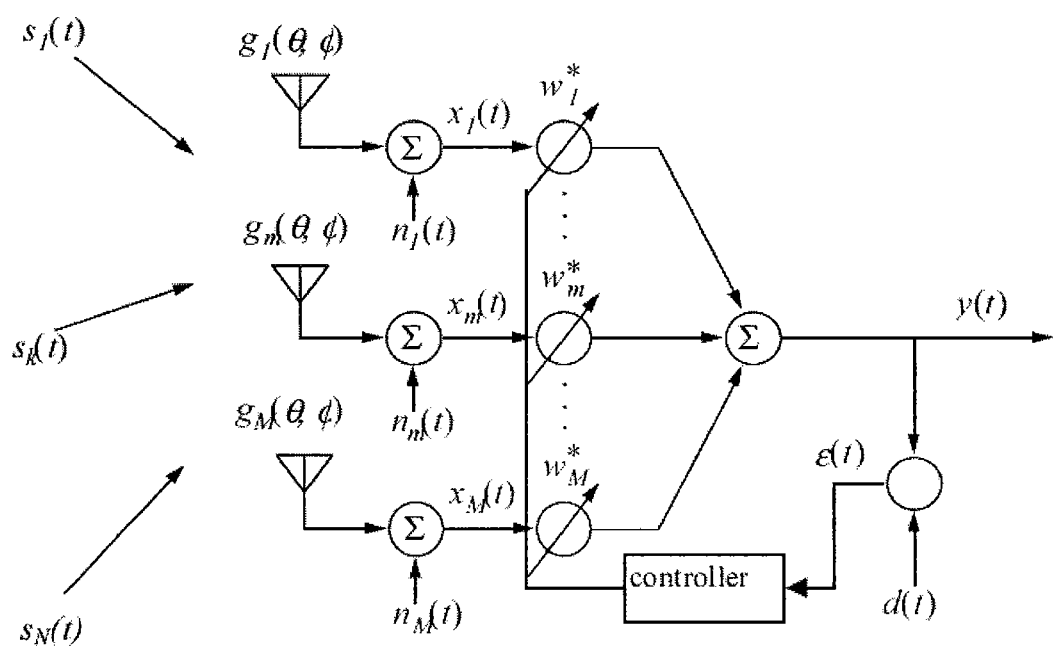
FIG. 1 shows the basic mathematical model used for phased array antenna calculations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to interference avoiding MIMO.

Antenna systems are widely used in both ground based applications (e.g., cellular antennas) and airborne applications (e.g., airplane or satellite antennas). Such antennas may be in the form of an array having two or more antenna elements that are spatially arranged and electrically interconnected to produce a directional radiation pattern.

Array beam forming techniques exist and are that can yield multiple, simultaneously available beams directed toward desired spatial locations. The beams can be made to have high gain and low sidelobes, or to have a controlled beamwidth. The response of the antenna array can also be controlled to produce nulls at desired spatial locations. For example, so-called "smart" antenna systems, such as adaptive or phased array antennas, combine the outputs of multiple antenna elements with signal processing capabilities to transmit and/or receive communications signals (e.g., microwave signals, RF signals, etc.). As a result, such antenna systems can vary the transmission and/or reception pattern of the communications signals.

A related application of an antenna array is for beam scanning. In beam scanning, a single main beam of an array is steered and the direction can be varied either continuously or in small discrete steps. Techniques for beam scanning are similar to techniques for producing multiple beams and/or nulls.

Adaptive beam forming techniques dynamically adjust the array pattern to optimize some characteristic of the received signal. For instance, a spatial pattern of beams and nulls that increases the antenna response to a desired signal, while decreasing the antenna response to an unwanted signal. Antenna arrays using adaptive beam forming techniques can reject interfering signals having a direction of arrival different from that of a desired signal. Multipolarized arrays can also reject interfering signals having different polarization states from the desired signal, even if the signals have the same direction of arrival. These capabilities can be exploited to improve the capacity of wireless communication systems.

The interconnection between elements, called the feed network, can provide an adjustable phase to each element or can form a phased array. In optimum and adaptive beam forming, the phases (and usually the amplitudes) of the feed network are adjusted to optimize the received signal. The geometry of an array and the patterns, orientations, and polarizations of the elements influence the performance of the array.

Beam forming and beam scanning are generally accomplished by phasing the feed to each element of an array so that signals received or transmitted from all elements will be in phase in a particular direction. This is the direction of the beam maximum. Beam forming and beam scanning techniques are typically used with linear, circular, or planar arrays but some approaches are applicable to any array geometry. Array beams can be formed or scanned using either phase shift or time delay systems.

The basic theory of a fully adaptive array is known. A full adaptive array utilizes correlation techniques and feedback control to apply amplitude and phase weights commensurate with the radiation environment to each array element to achieve minimum interference.

Complex weights for each element of the array can be calculated to optimize some property of the received signal. This does not always result in an array pattern having a beam maximum in the direction of the desired signal but can yield an optimal array output signal. Most often this is accomplished by forming nulls in the directions of interfering signals. Adaptive beam forming is an iterative approximation of optimum beam forming.

A general array with variable element weights is shown in block-diagram form in FIG. 1. The output of the array y(t) is the weighted sum of the received signals $s_i(t)$ at the array elements having patterns $g_m$ (the patterns include gain g) and the thermal noise n(t) from receivers connected to each element. The patterns $g_m$ are functions of the azimuth angle θ and elevation angle φ of the respective array element m. In FIG. 1, $s_1(t)$ is the desired signal, and the remaining L signals are considered to be interferers. In an adaptive system, the weights $w_m$ are iteratively determined based on the array output y(t), a reference signal d(t) which approximates the desired signal, and previous weights. The reference signal is assumed to be identical to the desired signal. In practice this can be achieved or approximated using a training or synchronization sequence, or pilot signals.

For example, each antenna element typically has a respective phase shifter and/or gain element associated therewith. The phase shifters/gain elements may be controlled by a central controller, for example, to adjust respective phases/gains of the antenna elements across the array. Thus, it is not only possible to steer the antenna beam, but it is also possible to perform beam shaping and/or adjust beam width (i.e., "spoiling") to receive or transmit over different areas.

Another configuration of a phased array antenna is that the array of elements may be arranged in sub-groups, and each of the sub-groups used for different antenna beams to thus provide multi-beam operation. However, one potential drawback of such multiple beam arrays is that "friendly" signals arriving on one of the beams can be interfered with (i.e., jammed) even by friendly signals arriving on another beam.

Phased array antennas allow the electronic steering of an antenna beam in any direction and with high antenna gain by controlling the phase at each antenna element. A beam can be "moved in space" using entirely electronic means through control of the phase and amplitude at each antenna element used to generate the beam. This beam steering technique is much more compact and much faster than mechanically steered arrays. Furthermore, phased arrays allow the creation of deep nulls in the radiation pattern to mitigate strong interference signals from several different directions.

A conventional phased array system uses a phased array as for at least one of either the transmitter or the receiver. Multiple Input, Multiple Output ("MIMO") as used herein refers to a system having a phased array at both the transmitter and receiver. Existing algorithms determine the phased array weights by analyzing the channel between the transmitter and the receiver. Transmitter phased array weights are selected to maximize the radiated power in the direction of the receiver, and the receiver phased array weights are selected to maximize gain in the direction of the transmitter.

Existing MIMO algorithms assume that the interference covariance matrices $I_A$ and $I_B$ are both identity, but this is not necessarily an accurate assumption. If the interference covariance at either station is in fact identity, the algorithm presented herein simplifies to classical MIMO.

In particular, some embodiments include a method for communicating a radio signal between a first station and a second station. The method includes estimating at least one characteristic of a radio channel from the first station having a first plurality of weightable transceiving elements, to the second station having a second plurality of weightable transceiving elements; calculating a receive weighting of at least one weightable transceiving element at the second station, responsive to the estimate; calculating a transmit weighting of at least one weightable transceiving element at the first station; weighting the first plurality of weightable transceiving elements with the transmit weighting to form transmit-weighted transceiving elements at the first station; weighting the second plurality of weightable transceiving elements with the receive weighting to form receive-weighted transceiving elements at the second station and then communicating the radio signal by transmitting from the transmit-weighted transceiving elements at the first station, over the radio channel, to the receive-weighted transceiving elements at the second station.

Estimating at least one characteristic of the radio channel may further include transmitting a predetermined pilot signal from the first station to the second station.

The estimation of a characteristic of the radio channel may include estimating the amplitude response and/or the phase response between at least one of the transceiving elements of the first station and at least one of the transceiving elements of the second station. Optionally, at least one transmit weighting of the first station may be further responsive to at least one receive weighting of the second station.

The estimation of a characteristic of the radio channel may be repeated at a later point in time. The estimates may also averaged over time or over frequency.

The estimation of a characteristic of the radio channel may include the sub-steps of estimating the characteristic of the radio channel between all or some of the antenna elements from the first station and all or some of the antenna elements from the second station. From these estimates, a channel estimate matrix is formed.

In one embodiment of the algorithm of the present application the vectors $\{t_A, r_A, t_B, r_B\}$ that weigh the transmit signals and the receive signals at the antenna arrays A and B respectively are arrived at in a way that is optimal ("maximum signal-to-noise ratio"), given both channel condition $(C_A, C_B)$ and interference environment $(I_A, I_B)$. Since both channel and interference conditions are a priori unknown and potentially change with time, the algorithm typically executes in a real-time manner in order to adapt to changes.

Conventional algorithms determine weights of phased array antennas, but ignore the possibility of interference along the channel. Some embodiments calculate transmit and receive array weights that are optimized so that they avoid interference, thereby improving throughput over conventional phased arrays. Some embodiments including these features may also be referred to as interference-avoiding MIMO. This may also be referred herein simply as "MIMO" if it is clear from the context that the reference does not refer to classical MIMO.

More generally, MIMO (both classical and interference-avoiding MIMO) involves a generalized concept of direction. In this concept, "direction" does not necessarily correspond to a physical direction of arrival, but may refer to a vector of weights in an abstract channel space. MIMO then aligns the transmit weight vector and receive weight vectors in preferred directions within the abstract channel space. Interference-avoiding MIMO additionally nulls out interfering directions within the abstract channel space.

In less-abstract terms, MIMO in general, and interference-avoiding MIMO in particular, do not necessarily create increased signal-to-noise ratio (SNR) by means of coherence. MIMO may create improved SNR by means of diversity in the number of paths, i.e., if there are N-squared paths between the transmit array and the receive array, with "N" being the number of antennas at each end, then the probability that all of the paths together fail to provide a reliable communication path is very small, even if the reliability of any one path is low. Furthermore, interference-avoiding MIMO is able to reduce the effect of interference, even if both desired signal and interference lack coherence across the receive array.

Orientation of the array (e.g., circular or linear) is not important, because MIMO operates in a rich scattering environment that does not preserve coherence. A convenient and portable antenna arrangement may be used for some applications. Antenna element separation should be at least $50\lambda$ within each array, so that paths between the antenna elements are sufficiently statistically uncorrelated for reason of diversity.

Some embodiments may be used with other devices that improve communication reliability and speed, such as error-correcting codes, interleavers, contention resolution schemes such as automatic-repeat request, etc. If these embodiments are used with a communication scheme that divides information flow across channels (slots) in time or frequency or both, the embodiment may be applied to the individual channels constituting the multiplexing scheme. That is, a different set of weights and resulting beam patterns can be applied to different time slots within a time-division multiplexed signal (e.g., $TDM_1 \ldots TDM_N$), and/or to different sub-carriers within a frequency-division multiplexed signal. Thus, some embodiments may be used in a time-, frequency- or code-division multiplexing (TDMA/FDMA/CDMA) scheme. In particular, embodiments may used for each sub-carrier of an orthogonal frequency division multiplex (OFDM) system.

Some embodiments may also be used to support a variety of networking connections. For instance, $TDM_1$ may support a point-to-point connection, whereas $TDM_2$ may support a point-to-multipoint connection, and $TDM_3$ may support a multipoint to multipoint connection.

Some embodiments employ matrix calculations that are known. In particular:

Square-Root of a Diagonal Matrix: Given a diagonal matrix $\Lambda$, its square-root is denoted $\Lambda^{1/2}$ or sqrt($\Lambda$), and is defined as the diagonal matrix whose components are the square-roots of the components of $\Lambda$.

Eigenvalue Decomposition of a Matrix: Given a Hermitian matrix R, one may find an orthogonal matrix Q and a real diagonal matrix $\Lambda$ such that $R=Q\Lambda Q^\dagger$. When we write $[Q,\Lambda]=$ eig(R) within a certain algorithmic step, we mean that an Eigenvalue Decomposition of R is being computed.

Singular Value Decomposition (SVD) of a Matrix: Given any matrix $\Lambda$, one may find two orthogonal matrices U and V, and a diagonal matrix $\Sigma$, such that $A=U\Sigma V^\dagger$. We will denote the SVD step within a flowchart by means of the equation $[U,\Sigma,V]=$svd(A). In an SVD, the elements of $\Sigma$ are typically arranged in descending order.

Leading Right Singular Vector of a Matrix: The leading right singular vector v of a matrix $\Lambda$ is the first column of the matrix V that results from the operation $[U,\Sigma,V]=$svd(A). The relationship between v and A can be defined by the equation $v=lrsv(A)$.

Some embodiments provide an algorithm that coordinates the actions of multiple transmit-receive links in response to fading and interference conditions. The algorithm periodically estimates the channel matrix and the interference covariance and computes and adjusts the transmit weights and the receive weights at each end.

Figure 2:
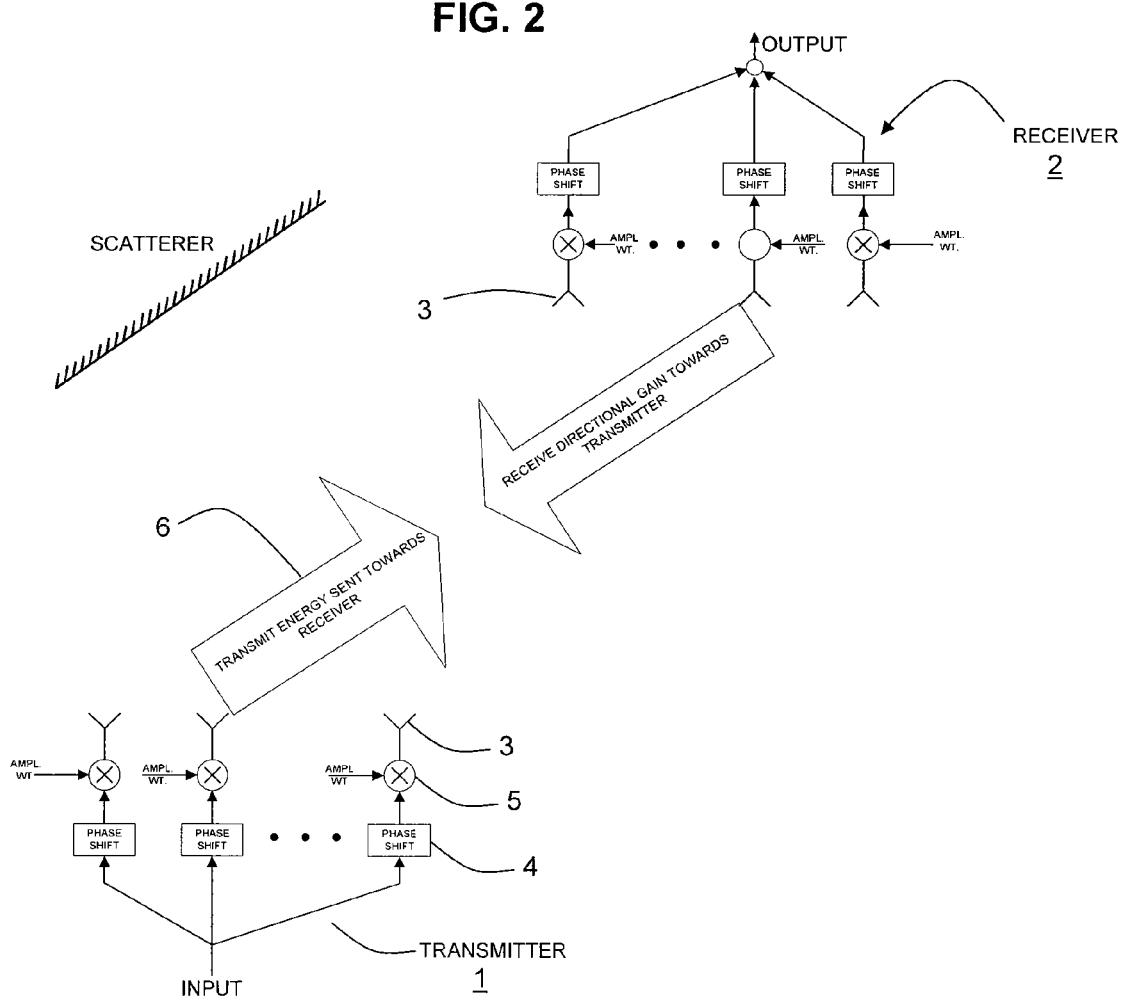
FIG. 2 shows a block diagram of a transmitting and receiving system usable with some embodiments.

A simplified description of the working principle behind MIMO follows, and can be better understood by reference to the figures. FIG. 2 shows a transmitter 1 and a receiver 2, each having a plurality of antenna elements 3. It will be understood that the communications link also may be bidirectional, wherein the transmitter 1 may receive radio frequency ("RF") energy and the receiver 2 may transmit RF energy. The placement of antenna elements 3 is typically in a predetermined, fixed arrangement, and may vary from that shown in FIG. 1.

"Channel" as used herein may refer either to a composite path from the transmitter phased array to the receiver phase array, or may refer to a path from a specific transmitting antenna element 3 to a specific receiving antenna element 3. Phased array weights as used herein may include complex weights, which adjust both amplitude and phase simultaneously. Therefore, weights or phased array weights will be understood to include both amplitude weighting and phase shifting, unless specifically limited otherwise. The intended usage of all terms will be clear from the context of usage.

At the transmitter 1, the plurality of antenna elements 3 together with adjustable phase shifters 4 and amplitude weights 5 acts as a phased array antenna. At the receiver 2, a similar plurality of antenna elements, adjustable phase shifters and amplitudes weights acts as another phased array antenna. The adjustable phase shifters 4 and amplitude weights 5 may be provided in a different order than that shown in FIG. 2. Furthermore, the adjustable phase shifter 4 and amplitude weight 5 may be combined into a complex weighting which simultaneously adjusts phase and amplitude weighting. The weighting may be implemented with discrete elements, or may be implemented with a processor digitally applying a complex weighting to the signal received on or transmitted from each of the antenna array elements.

Referring to FIG. 2, the transmitter 1 is designated as "station A" and the receiver 2 is designated as "station B", for the benefit of the mathematical notation presented herein. Station A and station B, respectively have a and b antenna elements 3. The transmit energy 6 sent from the transmitter 1 to the receiver 2 travels over individual RF channels from transmit antenna j of A to receive antenna i of B, and each of these individual RF channels is designated by $c_{ij}$. At Station B, the scalar channels $c_{ij}$ are collated into a b×a matrix, $C_B$, the $ij^{th}$ element of which is $c_{ij}$. Likewise Station A constructs an a×b channel matrix $C_A$. Station A experiences interference that is characterized by an interference covariance matrix $I_A$, while Station B experiences interference with covariance $I_B$. The vector of weights to be applied at to the outgoing stream at A is denoted by $t_A$ (an a×1 vector), and the vector to be applied to the incoming stream at A is denoted $r_A$ (an a×1 vector). The equivalent vectors at Station B are denoted $t_B$ and $r_B$, both b×1 vectors. The superscript dagger (†) is used here to indicate the conjugate-transpose of a matrix.

The phased array antenna of transmitter 1 operates in this embodiment by adjusting in amplitude and phase the RF energy transmitted from each antenna element 3, so as to maximize the radiated power of the transmit-array in the direction of the receive array. Likewise the phased array antenna of receiver 2 in this embodiment is adjusted to maximize the gain of the receive-array in the direction of the transmit-array. The adjustments to amplitude and phase done at transmit and receive ends are equivalent to multiplication of the baseband signal by complex weights $\{t_A, t_B\}$ and $\{r_A, r_B\}$ discussed above.

Figure 3:
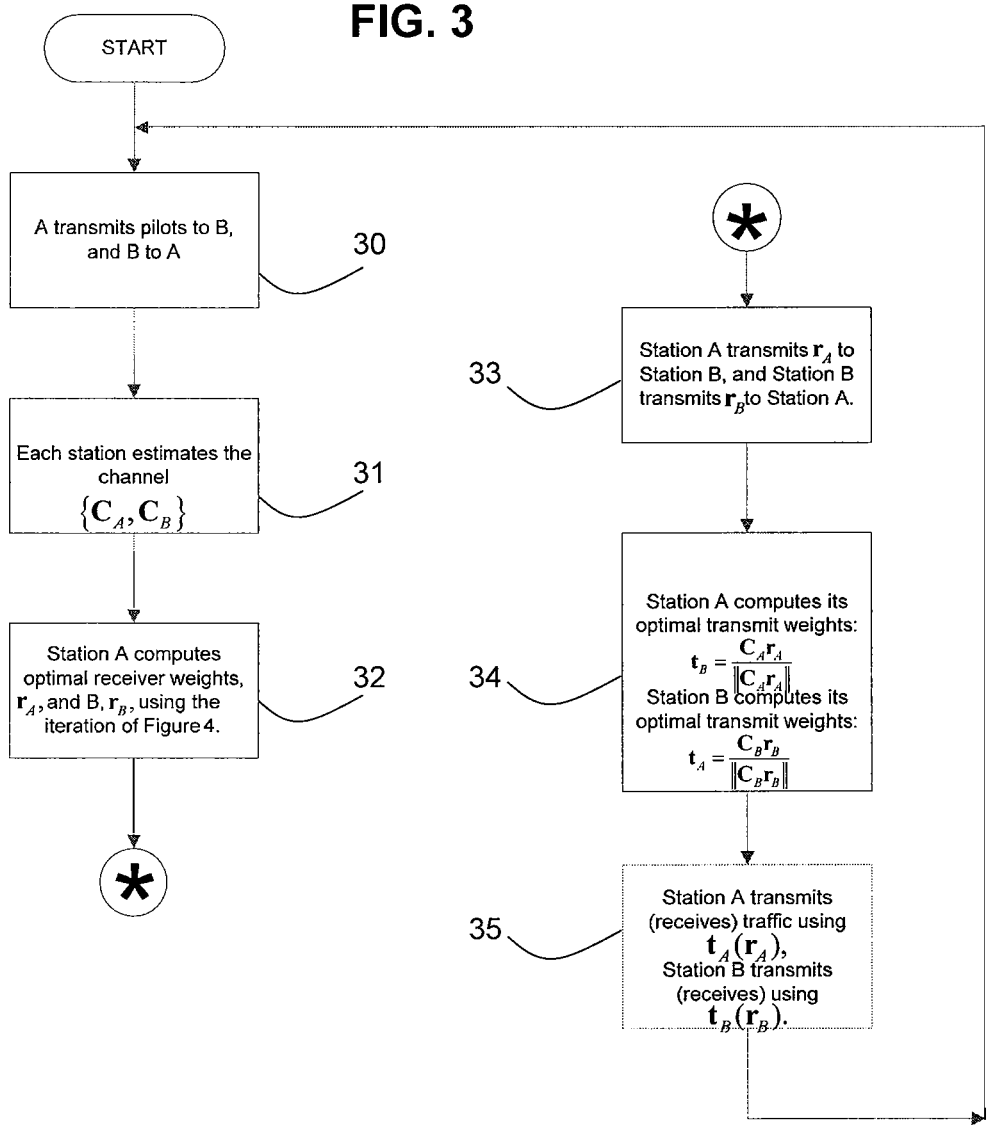
FIG. 3 shows a flow chart of calculating the transmitter and receiver weighting factors, given the covariance matrix for an interfering signal.

The algorithm includes two threads in this embodiment, as depicted in FIGS. 3 and 4. One thread ("Thread-I") carries out the computations needed to arrive at the optimal transmit ($\{t_A, t_B\}$) and receive ($\{r_A, r_B\}$) weights. The other thread ("Thread-II") determines the receive covariance matrix, which is an auxiliary matrix used by the first thread. First Thread-I is described, then Thread-II.

Thread-I

One embodiment of Thread-I is shown in the flow chart of FIG. 3. The receive covariance matrix is denoted $R_A$ at Station A and $R_B$ at Station B. Typically, at all times, Thread-I has access to the latest estimate of the receive covariance matrix as computed by Thread-II. In this embodiment, Thread-I is divided into five phases, as follows.

Pilot Transmittal: Block 30 of FIG. 3 shows "pilot symbols" which are periodically transmitted by each antenna element of each station. "Pilot symbols" are symbols known to both A and B, thus their information content is zero. The purpose of sending pilot signals is so that every antenna element of the other station can make a measurement of the channel, by comparing the received noisy pilot signal against the transmitted pilot signal as described below.

Channel Estimation: Block 31 of FIG. 3 shows that the noisy pilot symbol received by an antenna element of a station directly indicates the channel (i.e., amplitude and phase) between the particular transmit-receive antenna pair for which the pilot was sent. Depending on the multiplexing scheme, the channel estimate may be improved by averaging across time or frequency or both, as long as the change in the channel estimate over time and/or frequency is small compared to the window used for averaging. At this point each station has an estimate of the channel matrix C, wherein each element $c_{ij}$ of channel matrix C represents the channel response from transmitter i to receiver j.

Receiver Optimization: Block 32 of FIG. 3 shows that each end of the link now executes an iterative algorithm in order to determine the weight-vectors $r_A$ and $r_B$. The algorithm is shown in FIG. 4. The receiver optimization algorithm executes at Station B as well, with the subscript A replaced by B in the pseudo-code of FIG. 4. The iterative algorithm continues until either a maximum number of iterations has been reached, or the fractional difference between successive $r_A$ becomes less than a predetermined threshold.

Feedback: In block 33 of FIG. 3, subsequent to determining the optimal $r_A$ and $r_B$ (using FIG. 3 above), Station 'A' sends to Station 'B' the actual value of the vector $r_A$, and likewise Station 'B' sends to Station 'A' the actual value of the vector $r_B$.

Transmitter Optimization: Block 34 of FIG. 3 shows that each station determines the optimal transmit weight-vectors $t_A$ and $t_B$ using the receive vector of the other party. If that were not the case, i.e., if the transmit vector was derived by a party's own receive vector, there would be no need to exchange the receive vectors $r_A$ and $r_B$ between the two sides.

Interference avoiding MIMO optimizes transmit weights so as to direct energy not necessarily directly towards the receiver, but possibly towards some other scatterer. The receiver co-operatively looks towards the scatterer, thereby reducing the antenna response in the direction of an interference. If the desired signal and the interference both come from the exact same direction, then it would be impossible to eliminate the interferer without getting the transmitter to modify its talk-direction. The equations involved in transmitter optimization are:

$$t_B = \frac{C_A r_A}{\|C_A r_A\|},$$

and likewise for $t_B$:

$$t_A = \frac{C_B r_B}{\|C_B r_B\|}.$$

Block 35 of FIG. 3 shows that traffic symbols may now be sent using the just-obtained transmit weights $\{t_A, t_B\}$, and may be received using the just-obtained receive weights $\{r_A, r_B\}$. Since both channel and interference conditions are liable to change with time, pilot symbols are periodically re-sent, thereby triggering the remaining steps of Thread-I. In this way the transmit- and receive weights $\{t_A, r_A, t_B, r_B\}$ are periodically re-computed in order to adapt to a changing environment.

FIG. 4 shows further details of the receiver optimization shown in block 32 of FIG. 3.

Thread-II

FIG. 5 shows the pseudo-code for Thread-II, according to one embodiment. Thread-II periodically updates an estimate of the receive covariance matrix, and to supply this matrix to Thread-I upon demand. As such, the receive covariance matrix is simply a time average of the outer product of the vector of signals received at an array. The averaging can be done in any number of ways, for example using a fixed-length window (i.e., FIR-filter averaging), or in an auto-regressive manner (i.e., IIR-filter averaging) or some combination of both. In FIG. 5, where an example Thread-II calculation is described, the receive covariance matrix is estimated in an auto-regressive manner. In this figure, α represents a forgetting factor, and the vector $x_A$ represents the vector of signals received by the antenna array at Station A. The forgetting factor α may be set to a number close to unity (say 0.999) if the interference environment is expected to be stationary, or it may be set away from unity (say 0.9) if the interference environment is expected to change rapidly. Of course, a similar procedure would hold at Station B, with subscript A replaced by B.

Application of the Method

Figure 6:
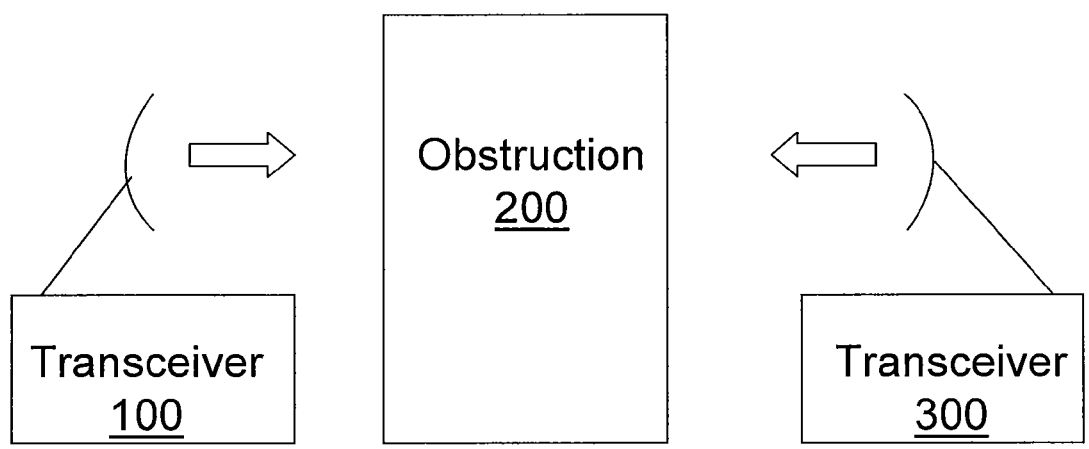
FIG. 6 shows an obstruction between two transceivers.
Figure 7:
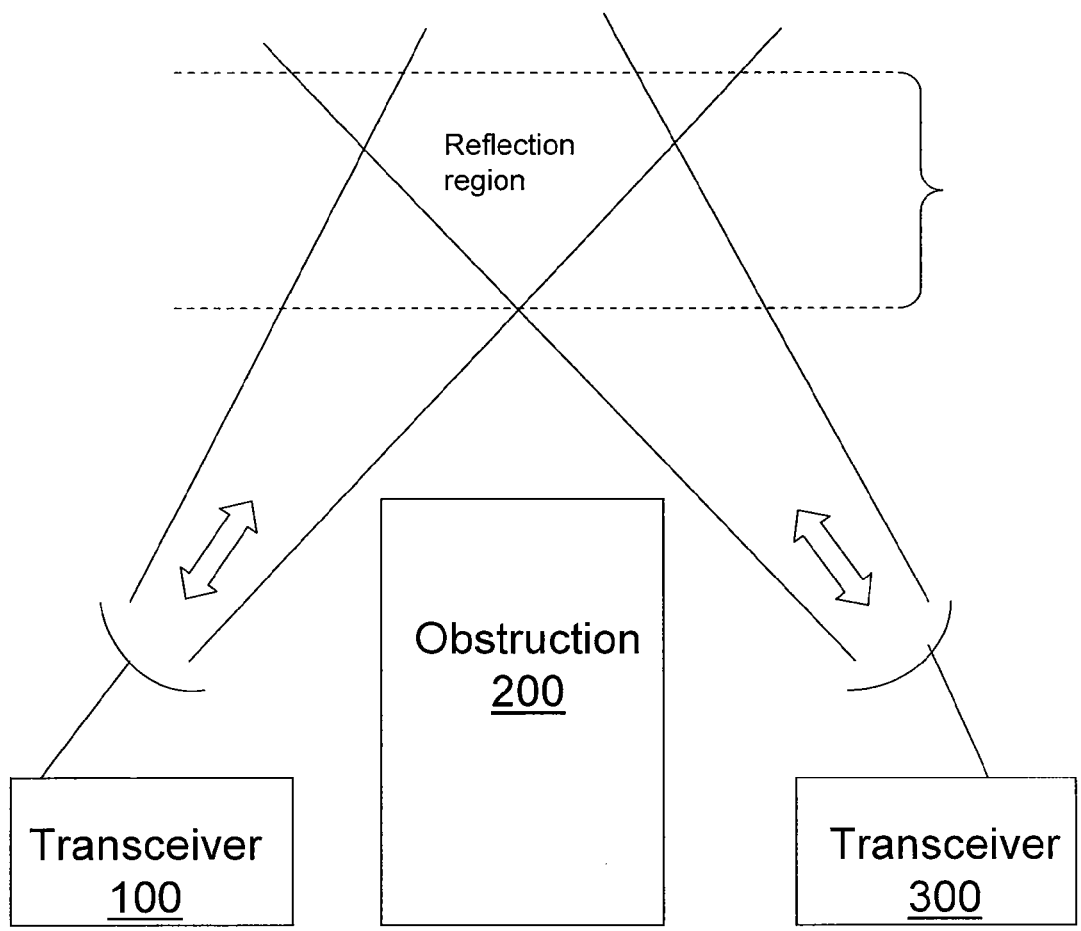
FIG. 7 shows using the troposphere to overcome an obstruction between two transceivers.
Figure 8:
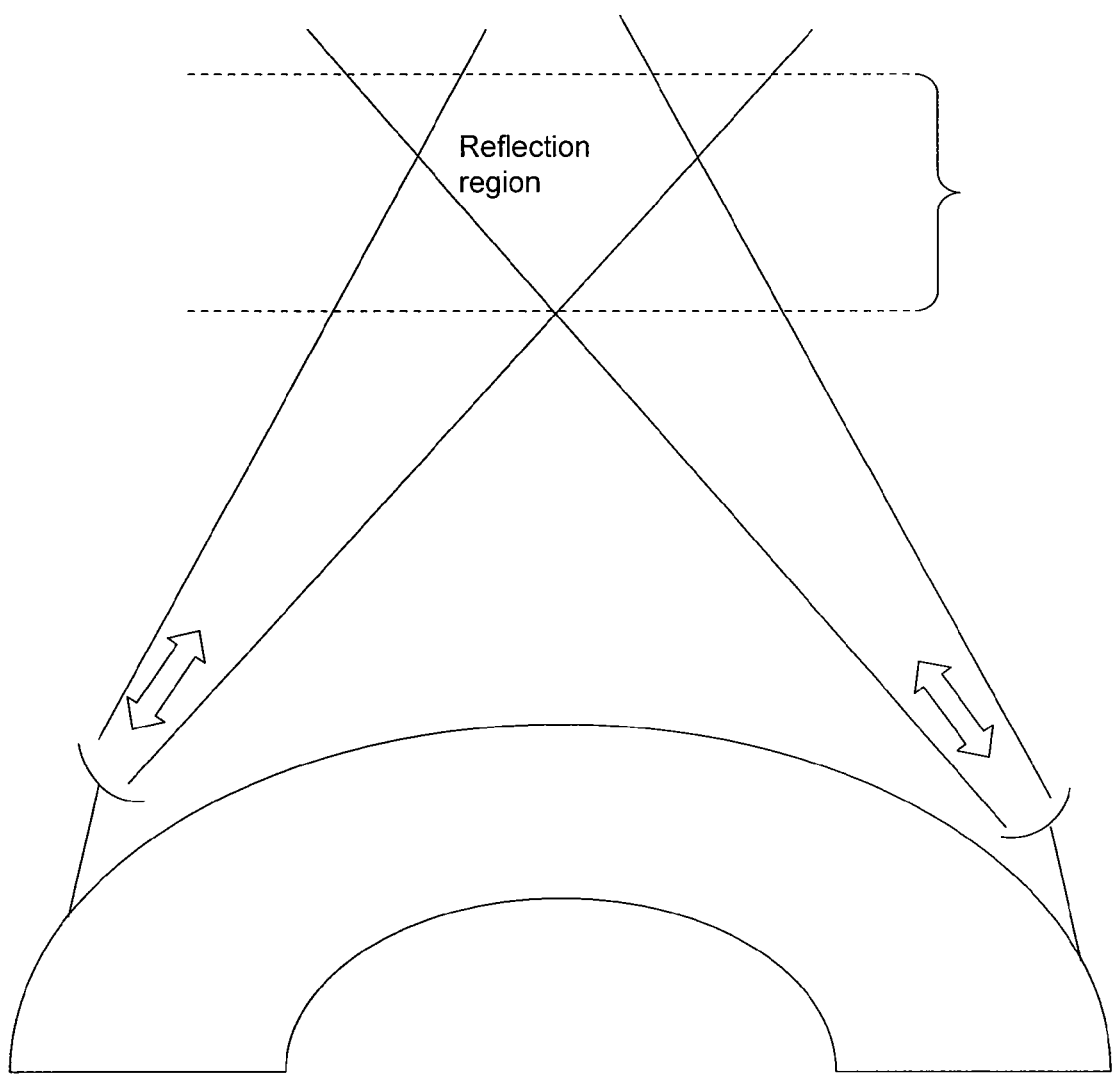
FIG. 8 shows using the troposphere to overcome earth curvature between two transceivers.

The combination of Thread-I and Thread-II continually updates the transmit weights and the receive weights so that a direction of transmission and reception is selected in order to improve the desired signal, while avoiding the effects from an unwanted interference. In particular, a direct transmission path from transmitter to receiver may not be available. For instance, as shown in FIG. 6, there may be an obstruction between the transceiver 100 and transceiver 200, wherein a transceiver combines the functions of both a transmitter 1 and a receiver 2. In particular, the transmitter and receiver may be over the horizon from each other. In another example, there may be an obstruction between the transmitter and receiver, for instance a mountain. In this situation, a reflection path may be available, as shown in FIGS. 7 and 8. The reflection path may include a scattering means capable of changing the direction of propagation of RF energy, for instance reflective particles; ionized particles; tropospheric scattering; changes in the refractive index of the communication path, for instance refractive index changes caused by changes in one or more characteristic of layers of the atmosphere, such as temperature or density; ground reflections; reflections from manmade objects such as buildings or objects that are airborne, tethered, or suspended; natural objects such as a cliff or mountain; or any combination of these means. The scattering means is in a position that is used to redirect the desired RF energy, while avoiding unwanted RF energy (i.e., the interference).

In another example, unwanted RF interference is present. RF interference of some form is inherent in the vast majority of wireless communication, and it is desirable to minimize the effect of the unwanted RF interference upon transmission link performance. Examples of communication systems susceptible to RF interference include cellular communication, terrestrial wireless microwave links, short-range LAN wireless, air-traffic communication and sea-traffic communication. Such communication systems may have industry-wide technology standards governing the wireless transmission design and performance. In cellular application, examples of technology standards include Global System for Mobile communications (GSM), CDMA2000, Wideband Code Division Multiple Access (WCDMA), Evolution-Data Optimized (EV-DO), High Speed Packet Access (HSPA) and their variants, all of which are well know to persons skilled in the art of cellular communication. In the short-range LAN wireless market, there is the IEEE-802.11 ("WiFi") family of standards. There may also be proprietary communication systems, having a transmission link designed to proprietary specifications, which are not the basis of an industry-wide standard. There are also standards under development by industry working groups for future communication services, for instance the IEEE-802.16 family of standards, also known as "WiMax".

In at least the wireless communication systems discussed above, which are subject to unintentional or intentional interference, usage of multiple antennas at either one end or both ends of the transmission link may improve the transmission link quality, and/or improve the bit rate available over the transmission link for a given link quality. The MIMO technique described herein can be used to employ multiple antennas.

Figure 9:
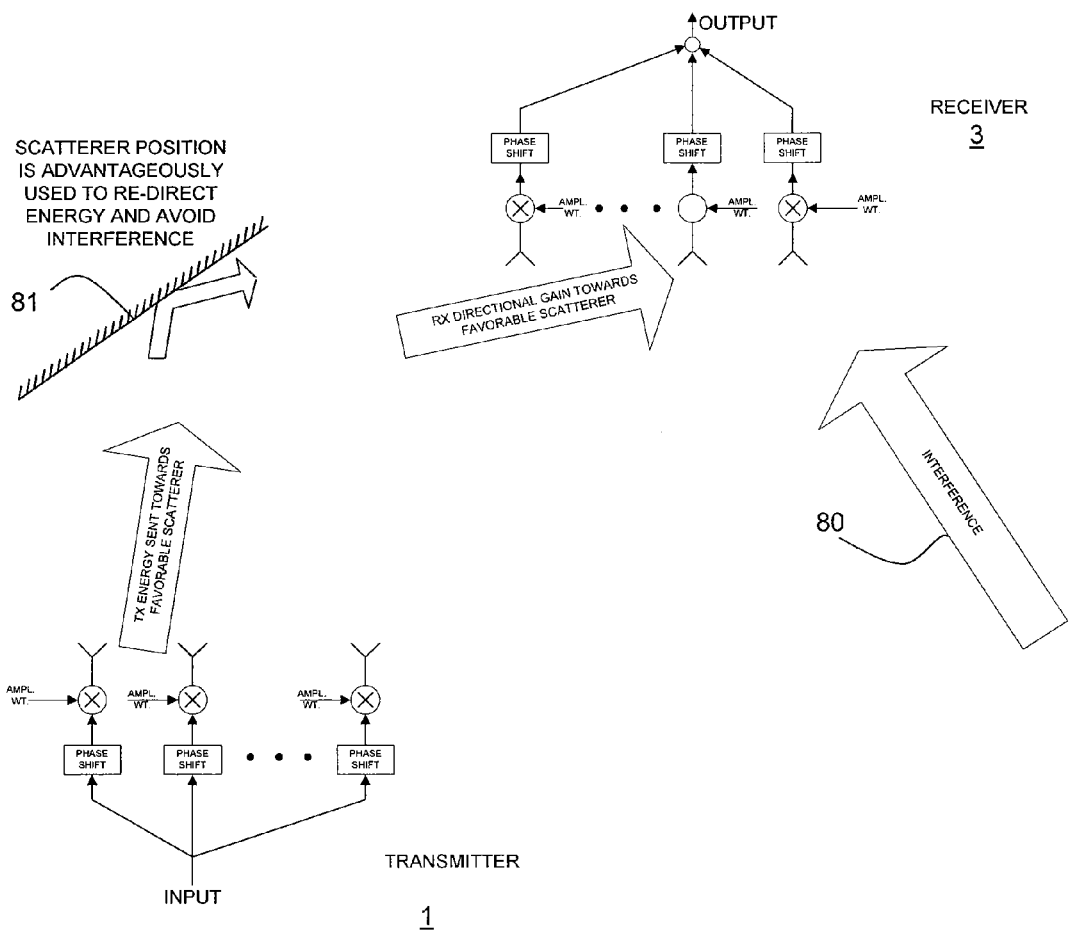
FIG. 9 shows an application of an embodiment wherein the desired weights are selected to avoid responding to an interfering signal, and to route the desired signal through a reflective and/or scattering region.

An interference avoiding MIMO communication system may adaptively reconfigure the antenna response, for instance by using a reflection region 81 having an advantageous response or channel characteristic, between the transmitter 1 and receiver 2, compared to a direct path between the transmitter 1 and receiver 2. There may also be an unwanted interfering signal 80 present, as shown in FIG. 9. The transmitter and receiver antenna weights are continually updated to track changes in the transmission characteristics of the channel, primarily to compensate for apparent changes in position of the interfering signal 80. The transmit antenna weights and receive antenna weights may also be changed to improve the response to the desired signal between the transmitter and receiver, in response to changes arising from time-varying changes to the channel characteristics. The interference avoiding MIMO communication system described herein may be used at least with the cellular communication, terrestrial wireless microwave links, short-range LAN wireless, air-traffic communication and sea-traffic communication systems discussed above.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware). The choice of vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the re recitation of "two recitations," without other modifiers, typically means at least two recitations, or two or more recitations). Furthermore, in those instances where a convention analogous to "at least one of A, B and C," etc. is used, in general such a construction is intended in the sense one having skill in the art would understand the convention (e.g., "a system having at least one of A, B and C" would include but not be limited to systems that have A alone, B alone, C alone, A and B together, A and C together, B and C together, and/or A, B and C together, etc.). In those instances where a convention analogous to "at least one of A, B or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for communicating a radio signal between a first station and a second station, comprising:
estimating at least one characteristic of a radio channel from the first station comprising a first plurality of weightable transceiving elements, to the second station comprising a second plurality of weightable transceiving elements, wherein estimating the at least one characteristic includes estimating the characteristic $c_{ij}$ of the radio channel from element i of the first plurality of weightable transceiving elements to element j of the second plurality of weightable transceiving elements, for at least a portion of the first plurality of weightable transceiving elements and at least a portion of the second plurality of weightable transceiving elements and forming a channel estimate matrix $C_A$ from the estimated characteristics $c_{ij}$ that includes the estimate of the at least one characteristic;
calculating a receive weighting of at least one weightable transceiving element at the second station, responsive to the estimate;
calculating a transmit weighting of at least one weightable transceiving element at the first station;
weighting the first plurality of weightable transceiving elements with the transmit weighting to form transmit-weighted transceiving elements at the first station;
weighting the second plurality of weightable transceiving elements with the receive weighting to form receive-weighted transceiving elements at the second station; and communicating the radio signal by transmitting from the transmit-weighted transceiving elements at the first station, over the radio channel, to the receive-weighted transceiving elements at the second station.

2. The method of claim 1, wherein estimating at least one characteristic of the radio channel further comprises transmitting a predetermined pilot signal from the first station to the second station.

3. The method of claim 1, wherein estimating at least one characteristic of the radio channel comprises estimating the amplitude response and/or the phase response between at least one of the transceiving elements of the first station and at least one of the transceiving elements of the second station.

4. The method of claim 1, wherein at least one transmit weighting of the first station is further responsive to at least one receive weighting of the second station.

5. The method of claim 1, further comprising repeating the estimation of the at least one characteristic of the radio channel at a later point in time.

6. The method of claim 1, wherein estimating at least one characteristic of the radio channel further comprises averaging the characteristic over time.

7. The method of claim 1, wherein estimating at least one characteristic of the radio channel further comprises averaging the characteristic over frequency.

8. The method of claim 1, wherein calculating a receive weighting further comprises:
setting matrix $I_A = R_A$, wherein $R_A$ is a received covariance matrix of the weighted transceiving elements at the second station; and
iteratively repeating the following steps until the change in $r_A$ from one iteration to the next is less than a predetermined amount:
calculating an Eigenvalue decomposition of $I_A$, as: $[Q_A, \Lambda_A] = \text{eig}(I_A)$, wherein $\Lambda_A$ is a diagonal matrix;
determining $r_A$ as: $r_A = Q_A \Lambda_A^{-1/2} \text{lrsv }(C_A^\dagger Q_A \Lambda_A^{-1/2})$, wherein lrsv is the leading right singular vector of a matrix, and † is the conjugate transpose of a matrix, and $r_A$ is a vector of receive weights for the transceiving elements at the second;
subtracting $\alpha\alpha^\dagger$ from $I_A$, wherein $\alpha = C_A[C_A r_A/(\|C_A r_A\|)]$.

9. The method of claim 8, wherein calculating a transmit weighting further comprises:
providing to the first station the receive weighting $r_A$ and the estimate $C_A$ of the at least one characteristic of a radio channel from the second station; and
calculating a transmit weight vector $t_B = C_A[C_A r_A/(\|C_A r_A\|)]$.

10. The method of claim 8, further comprising updating the covariance matrix at a later time.

11. The method of claim 10, further comprising updating the vector of receive weights based on the updated covariance matrix.

12. The method of claim 8, wherein the covariance matrix is a time average of the outer product of a vector of signals received at the second station.

13. The method of claim 12, further comprising producing the time average by a process selected from the group consisting of a fixed-length window process, an autoregressive window process, and a process combining both fixed-length and autoregressive processes.

14. The method of claim 12, further comprising producing the time average by a process selected from the group consisting of FIR-filter averaging, IIR-filter averaging, and combined FIR/IIR filter averaging.

15. The method of claim 12, further comprising producing the time average by an autoregressive window process having an autoregression factor of between 0.9 and 0.999.

16. An apparatus for transmitting a radio signal, comprising:
a first plurality of weightable transceiving elements; and
a processor configured to estimate a characteristic $c_{ij}$ of a channel from element i of the first plurality of weightable transceiving elements to element j of a second plurality of weightable transceiving elements, for at least a portion of the first plurality of weightable transceiving elements and at least a portion of the second plurality of weightable transceiving elements; and to form a channel estimate matrix $C_A$ from the estimated characteristics $c_{ij}$ based on at least one signal received from a second plurality of weightable transceiving elements by at least a portion of the first plurality of weightable transceiving elements, to calculate receiving weights for at least a portion of the first plurality of weightable transceiving elements, responsive to the channel estimate matrix, and to calculate transmitting weights for at least a portion of the first plurality of weightable transceiving elements.

17. The apparatus of claim 16, further comprising an apparatus configured to transmit a predetermined pilot signal.

18. The apparatus of claim 16, wherein the processor is configured to estimate an amplitude response and/or a phase response of the channel based on the signal received from the second plurality of weightable transceiving elements.

19. The apparatus of claim 16, further comprising an apparatus configured to transmit the calculated receiving weights to the second plurality of weightable transceiving elements.

20. The apparatus of claim 16, wherein the processor is configured to repeat the estimate of the channel response.

21. The apparatus of claim 16, wherein the processor is configured to average over time the estimate of the channel response.

22. The apparatus of claim 16, wherein the processor is configured to average over frequency the estimate of the channel response.

23. The apparatus of claim 16, wherein the processor is configured to determine the receiving weights for at least the portion of the first plurality of weightable transceiving elements by setting matrix $I_A = R_A$, wherein $R_A$ is a received covariance matrix of the at least the portion of the first plurality of weightable transceiving elements, and is further configured to:
calculate an Eigenvalue decomposition of $I_A$, as: $[Q_A, \Lambda_A] = \text{eig}(I_A)$, wherein $\Lambda_A$ is a diagonal matrix;
determine $r_A$ as: $r_A = Q_A \Lambda_A^{-1/2} \text{lrsv }(C_A^\dagger Q_A \Lambda_A^{-1/2})$, wherein lrsv is the leading right singular vector of a matrix, and † is the conjugate transpose of a matrix, and $r_A$ is a vector of receive weights for the transceiving elements at the second station;
subtract $\alpha\alpha^\dagger$ from $I_A$, wherein $\alpha = \alpha = C_A[C_A r_A/(\|C_A r_A\|)]$; and
iteratively repeat until the change in $r_A$ from one iteration to the next is less than a predetermined amount.

24. The apparatus of claim 23, wherein the processor is configured to calculate the transmit weight vector $t_B = [C_A r_A/(\|C_A r_A\|)]$, wherein $r_A$ is a vector of receive weights provided to the processor, and $C_A$ is the estimate of the radio channel provided to the processor.

25. The apparatus of claim 23, wherein the processor is configured to update the covariance matrix at a later time.

26. The apparatus of claim 25, wherein the processor is configured to update the receive weights based on the updated covariance matrix.

27. The apparatus of claim 25, wherein the processor is configured to calculate the covariance matrix as a time average of the outer product of a vector of signals received.

28. The apparatus of claim 27, wherein the processor is configured to produce the time average by a process selected from the group consisting of a fixed-length window process, an autoregressive window process, and a process combining both fixed-length and autoregressive processes.

29. The apparatus of claim 27, wherein the processor is further configured to produce the time average by a process selected from the group consisting of FIR-filter averaging, IIR-filter averaging, and combined FIR/IIR filter averaging.

30. The apparatus of claim 27, wherein the processor is further configured to produce the time average by an autoregressive window process having an autoregression factor of between 0.9 and 0.999.

31. A non-transitory computer readable medium comprising computer executable instructions for:
   estimating at least one characteristic of a radio channel from a first station comprising a first plurality of weightable transceiving elements, to a second station comprising a second plurality of weightable transceiving elements, wherein estimating the at least one characteristic includes estimating the characteristic $c_{ij}$ of the radio channel from element i of the first plurality of weightable transceiving elements to element j of the second plurality of weightable transceiving elements, for at least a portion of the first plurality of weightable transceiving elements and at least a portion of the second plurality of weightable transceiving elements and forming a channel estimate matrix $C_A$ from the estimated characteristics $c_{ij}$ that includes the estimate of the at least one characteristic;
   calculating a receive weighting of at least one weightable transceiving element at the second station, responsive to the estimate;
   calculating a transmit weighting of at least one weightable transceiving element at the first station;
   weighting the first plurality of weightable transceiving elements with the transmit weighting to form transmit-weighted transceiving elements at the first station;
   weighting the second plurality of weightable transceiving elements with the receive weighting to form receive-weighted transceiving elements at the second station; and
   controlling the communication of the radio signal comprising transmitting from the transmit-weighted transceiving elements at the first station, over the radio channel, to the receive-weighted transceiving elements at the second station.

32. The computer readable medium of claim 31, wherein instructions for estimating at least one characteristic of the radio channel further comprises instructions for transmitting a predetermined pilot signal from the first station to the second station.

33. The computer readable medium of claim 31, wherein instructions for estimating at least one characteristic of the radio channel further comprises instructions for estimating the amplitude response and/or the phase response between at least one of the transceiving elements of the first station and at least one of the transceiving elements of the second station.

34. The computer readable medium of claim 31, wherein instructions for calculating a transmit weighting further comprises instructions responsive to at least one receive weighting of the second station.

35. A method of communicating a radio signal between a first station and a second station, comprising:
   estimating an interference condition for a signal transmitted from the first station, which comprises a first plurality of weightable transceiving elements, to the second station, which comprises a second plurality of weightable transceiving elements, the interference condition resulting from signals transmitted from the first station to the second station;
   calculating a receiving weight of one of the second plurality of weightable transceiving elements responsive to the estimated interference condition and an estimated channel condition of a signal channel from the first station to the second station;
   weighting the one of the second plurality of weightable transceiving elements;
   receiving a signal at the one of the second plurality of weightable transceiving elements from one of the first plurality of weightable transceiving elements; and
   receiving a second receiving weight from the first station, the second receiving weight based on a second estimated interference condition and an second estimated channel condition, where the second estimated interference condition and the second estimated channel condition are estimated based on signals transmitted from the second station to the first station.

36. The method of claim 35, further comprising transmitting the receiving weight to the first station, wherein the signal received at the one of the second plurality of weightable transceiving elements is transmitted from the one of the first plurality of weightable transceiving elements that is weighted based on the receiving weight and the estimated channel condition of the signal channel from the first station to the second station.

37. The method of claim 35, further comprising:
   calculating a transmitting weight of another of the second plurality of weightable transceiving elements responsive to the second estimated channel condition and the second receiving weight;
   weighting the another of the second plurality of weightable transceiving elements; and
   transmitting a second signal from the another of the second plurality of weightable transceiving elements to the first station.

38. The method of claim 35, further comprising estimating the estimated channel condition based on a pilot signal transmitted from the first station to the second station.

39. The method of claim 35, wherein estimating the interference condition comprises calculating a time average of the signals transmitted from the first station to the second station.

40. The method of claim 39, wherein the time average of the signals is performed using fixed-length window averaging or autoregression averaging.

41. A system comprising:
   a first plurality of weightable transceiving elements; and
   a processor configured to:
      estimate an interference condition for a signal transmitted from a station, which comprises a second plurality of weightable transceiving elements, to the first plurality of weightable transceiving elements, the interference condition resulting from signals transmitted from the station to the first plurality of weightable transceiving elements; and
      calculate a receiving weight of one of the first plurality of weightable transceiving elements responsive to the interference condition and an estimated channel condition of a signal channel from the station to the first plurality of weightable transceiving elements,
   wherein, the first plurality of weightable transceiving elements is configured to receive a second receiving weight from the station, the second receiving weight based on a second estimated interference condition and an second estimated channel condition, where the second estimated interference condition and the second estimated channel condition are estimated based on signals transmitted from the first plurality of weightable transceiving elements to the station.

42. The system of claim 41, wherein the one of the first plurality of weightable transceiving elements is configured to transmit the receiving weight to the station, wherein a signal received at the one of the first plurality of weightable transceiving elements is transmitted from one of the second plurality of weightable transceiving elements that is weighted based on the receiving weight and the estimated channel condition of the signal channel from the station to the first plurality of weightable transceiving elements.

43. The system of claim 41, wherein the processor is further configured to calculate a transmitting weight of another of the first plurality of weightable transceiving elements responsive to the second estimated channel condition and the second receiving weight.

44. The system of claim 41, wherein the processor is further configured to estimate the estimated channel condition based on a pilot signal transmitted from the station to the first plurality of weightable transceiving elements.

45. The system of claim 41, wherein to estimate the interference condition the processor is further configured to calculate a time average of the signals transmitted from the station to the first plurality of weightable transceiving elements.

46. The system of claim 45, wherein the time average of the signals is performed using fixed-length window averaging or autoregression averaging.

* * * * *

UNITED STATES PATENT AND TRADEMARK OFFICE
CERTIFICATE OF CORRECTION

PATENT NO.         : 8,526,525 B2
APPLICATION NO.    : 12/255572
DATED              : September 3, 2013
INVENTOR(S)        : Keerthi It is certified that error appears in the above-identified patent and that said Letters Patent is hereby corrected as shown below:

In the Drawings

In Fig. 9, Sheet 9 of 9, delete "RECEIVER 3" and insert -- RECEIVER 2 --, therefor.

In the Specification

In Column 3, Line 30, delete "$s_i(t)$" and insert -- $s_1(t)$ --, therefor.

In Column 4, Line 3, delete "Input," and insert -- Input --, therefor.

In Column 6, Line 2, delete "matrix $\Lambda$," and insert -- matrix A, --, therefor.

In Column 6, Line 8, delete "matrix $\Lambda$" and insert -- matrix A --, therefor.

In Column 6, Line 22, delete "bidirectional," and insert -- bi-directional, --, therefor.

In Column 6, Line 64, delete "at to the" and insert -- to the --, therefor.

In Column 8, Line 63, delete "transceiver 200," and insert -- transceiver 300, --, therefor.

In Column 10, Line 44, delete "and or" and insert -- and/or --, therefor.

In the Claims

In Column 13, Line 47, in Claim 9, delete "$t_B = C_A[C_A r_A/(\|C_A r_A\|)]$." and insert -- $t_B = [C_A r_A/(\|C_A r_A\|)]$. --, therefor.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,526,525 B2

In Column 14, Line 51, in Claim 23, delete "$\alpha=\alpha=C_A[C_A r_A/(\|C_A r_A\|)];$" and insert -- $\alpha=C_A[C_A r_A/(\|C_A r_A\|)];$ --, therefor.

In Column 16, Line 17, in Claim 35, delete "an second" and insert -- a second --, therefor.

In Column 16, Line 67, in Claim 41, delete "an second" and insert -- a second --, therefor.